Feb. 19, 1957 F. J. RODE 2,781,883
PRESSURE CONTROL FOR POWER PRESSES
Filed Feb. 9, 1955 5 Sheets-Sheet 1

INVENTOR.
FRED J. RODE
BY
Beau, Brooks, Buckley & Beau,
ATTORNEYS.

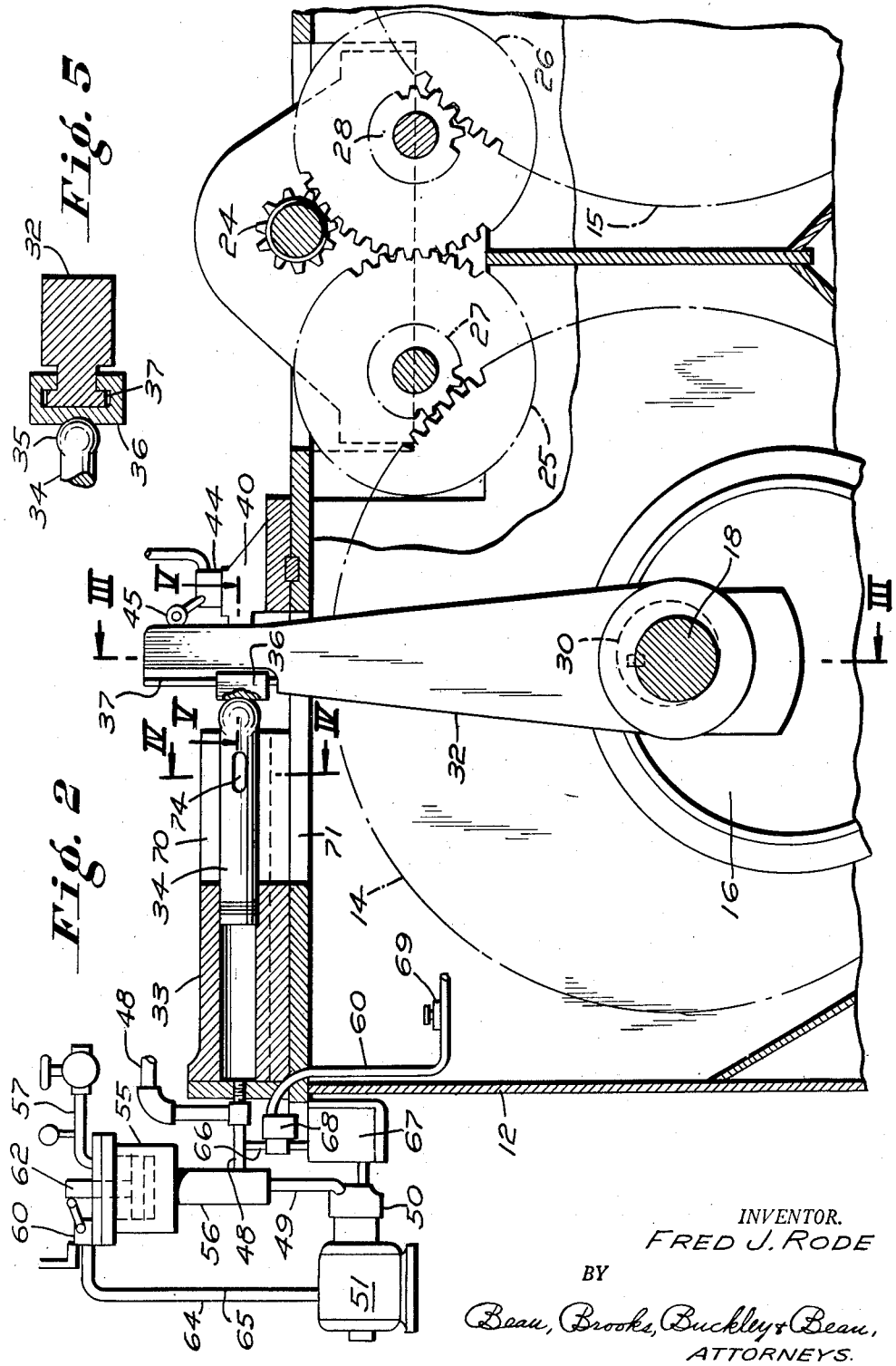

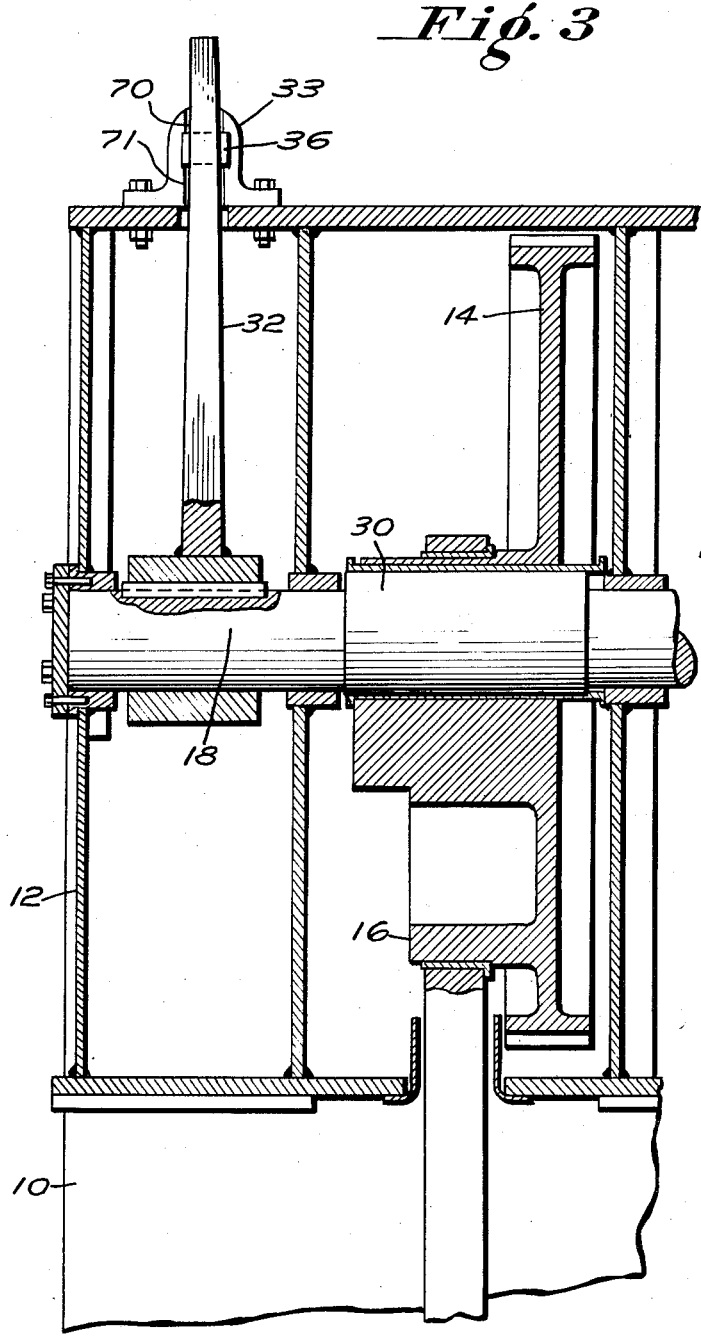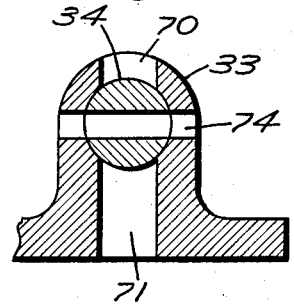

Feb. 19, 1957  F. J. RODE  2,781,883
PRESSURE CONTROL FOR POWER PRESSES
Filed Feb. 9, 1955  5 Sheets-Sheet 4
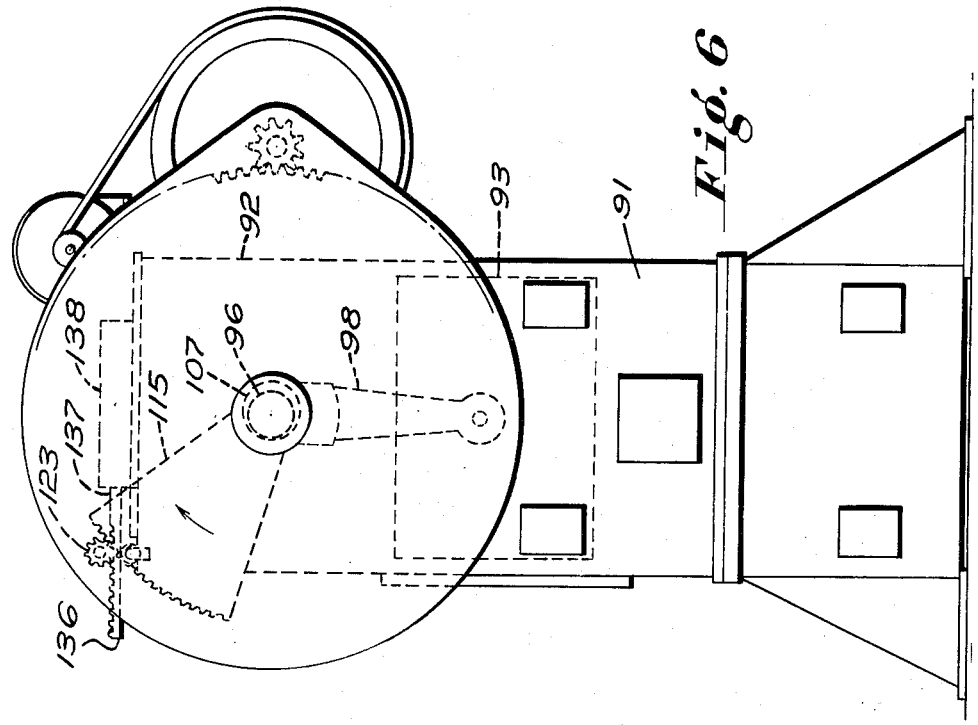
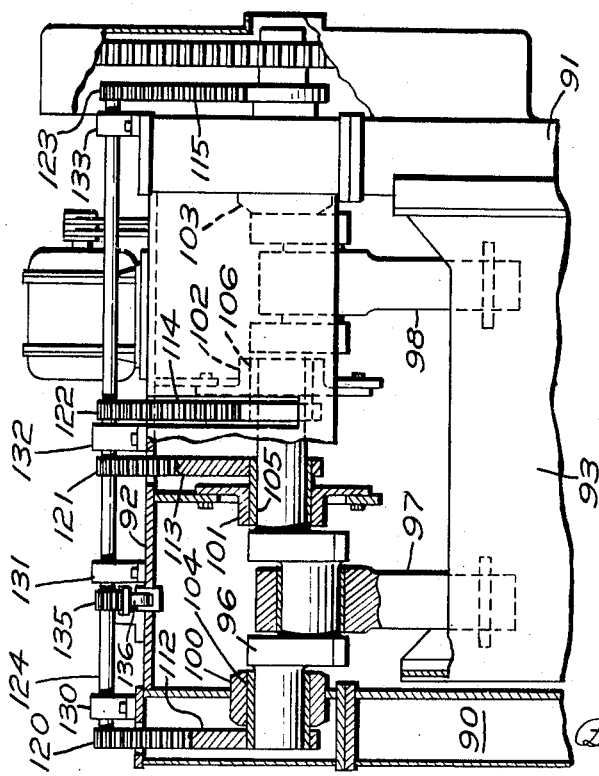
INVENTOR.
FRED J. RODE
BY
Beau, Brooks, Buckley & Beau,
ATTORNEYS.

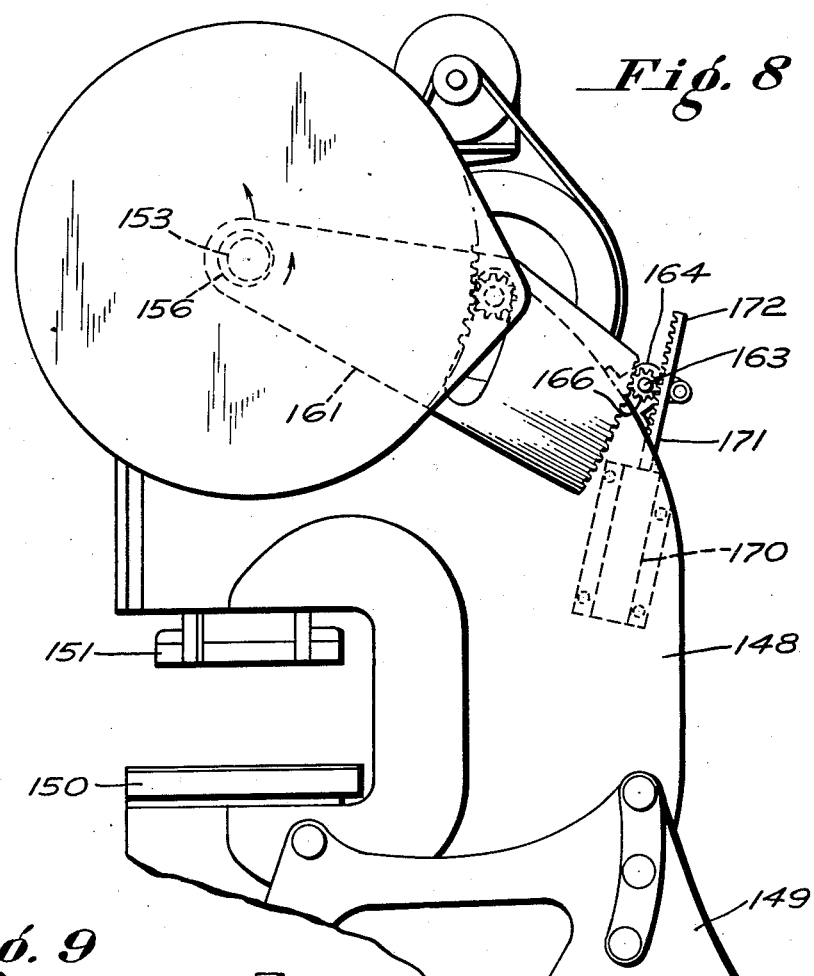
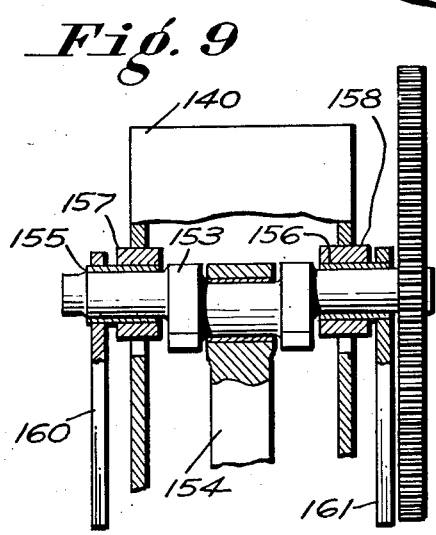

United States Patent Office 2,781,883
Patented Feb. 19, 1957

2,781,883

PRESSURE CONTROL FOR POWER PRESSES

Fred J. Rode, Chicago, Ill., assignor to Niagara Machine & Tool Works, Buffalo, N. Y.

Application February 9, 1955, Serial No. 487,067

9 Claims. (Cl. 192—150)

This invention relates to power presses and like machinery and more particularly to the drive means for reciprocating the slide or ram of machines of this general class.

In power presses of the general type wherein eccentrics or crankshafts are employed to reciprocate a slide or ram difficulty is often encountered by reason of the drive becoming jammed or stuck at or near a bottom dead center position. This trouble arises by reason of misadjustment of the position of the slide or ram; by employing metal workpieces of a greater thickness than intended; by inadvertently having two blanks or sheets of work material in position in a die instead of only one; by reason of mispositioning of a workpiece in a die, by reason of misadjustment, breakage or other fault or misadventure in the die itself; or for a variety of other reasons. When such jamming or sticking occurs it is frequently a major operation to free the jammed parts in order to release the slide and return its to an upper position.

The jamming or sticking may frequently be of such degree that the press slide cannot merely be "backed off" by reverse operation of the drive means, but must be released by resort to much more laborious and time-consuming procedures. Sometimes partial disassembly or loosening of the press frame structure is necessary and to some extent the advantages resulting from one piece welded frame construction have been foregone for the reason that such a construction does not admit of disassembly or loosening of the frame components.

The present invention provides a two-fold amelioration of this jamming or sticking problem; firstly, the arrangement of the present invention is such that a definite but readily adjustable allowed limit is imposed on the drive means in such a way that, regardless of the maximum rated tonnage of the power press, the applied force in any given instance has an adjustable upper limit at any point within such maximum rated capacity. This is important, among other reasons, because jamming conditions will often occur, due to complications of operation as outlined above and for other reasons, at loads and forces which are well within the maximum capacity of the press in normal operation.

The second major phase of novelty of the present invention resides in the means provided for releasing the press slide or ram when a jamming or sticking condition has actually occurred.

The novel apparatus and operation of the power press of the present invention is illustrated and described herein in conjunction with mechanical power press drives of both the eccentric and crankshaft types, although the principles are equally applicable to power presses and similar reciprocating metal working machines of other types. Further, the embodiments illustrated and described herein are of the two point eccentric and single and double crankshaft drive types, again merely by way of example, the principles being equally applicable to one point eccentric power presses or power presses employing more than two driving eccentrics or cranks and connections.

As indicated in the foregoing paragraph, several specific embodiments of the principles of the present invention are set forth in some details in the following specification and the accompanying drawings to illustrate the principles of the invention but the spirit and scope of the invention is not limited thereby nor otherwise than as defined in the appended claims.

In the drawings:

Fig. 2 is an enlarged elevational view of the upper crown portion of the power press of Fig. 1 with portions thereof in cross section for clearer illustration and with certain of the control elements thereof set forth somewhat schematically;

Fig. 3 is a cross-sectional view taken generally on the line III—III of Fig. 2;

Fig. 4 is an enlarged fragmentary cross-sectional view on the line IV—IV of Fig. 2;

Fig. 5 is a fragmentary cross-sectional view on the line V—V of Fig. 2;

Fig. 6 is a general side elevational view of another embodiment of the present invention;

Fig. 7 is a fragmentary front elevational view of the embodiment of Fig. 6, showing the upper or crown portion thereof and partially in cross section on a vertical plane through the crankshaft;

Fig. 8 is a general side elevational view of a still further embodiment of the invention; and Fig. 9 is a fragmentary cross sectional view of the crown portion of the embodiment of Fig. 8 taken on a vertical plane through the crankshaft.

Figure 1:
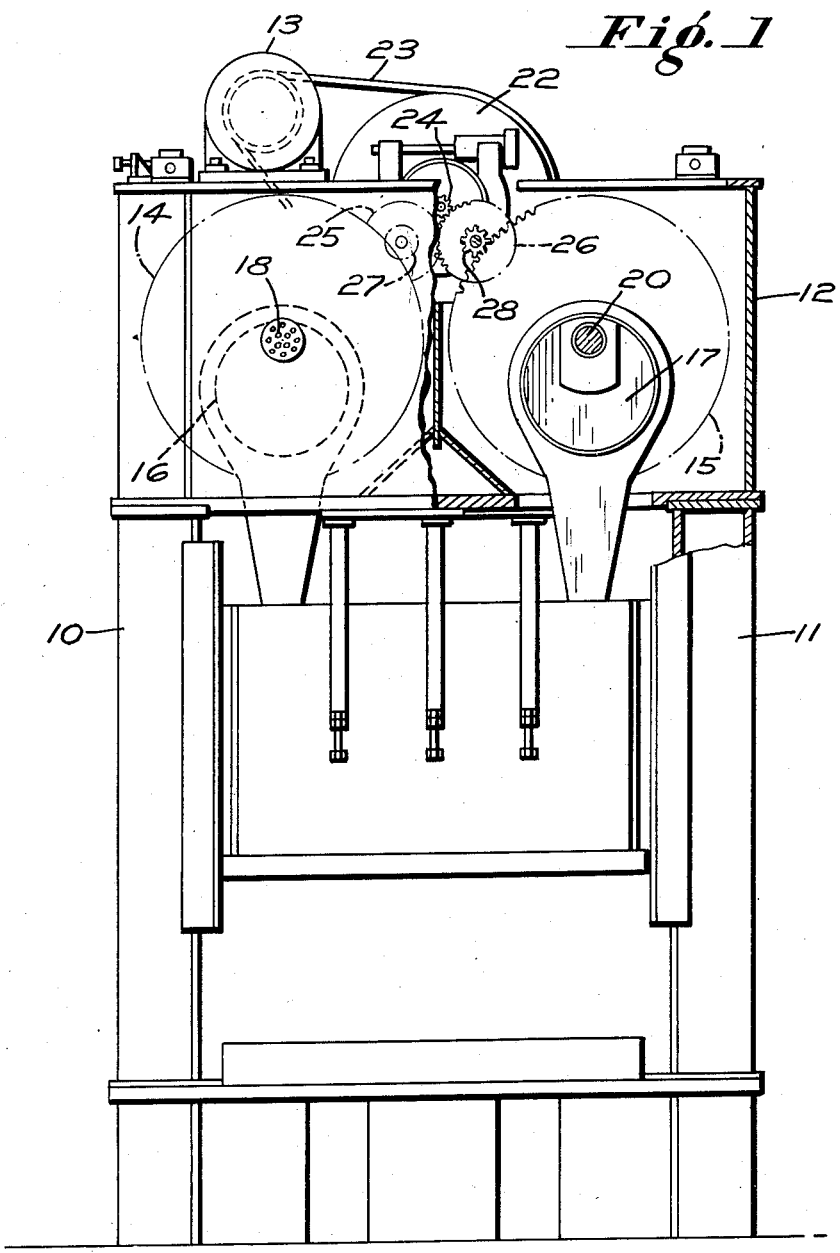
Fig. 1 is a general elevational view of one form of power press adapted to operate in accordance with the principles of the present invention.

Speaking generally, the invention is illustrated in the embodiment of Figs. 1 through 5 in conjunction with a two point eccentric power press having a pair of driving eccentrics each mounted on a fore and aft shaft, although the present invention may be utilized with other types of power presses as indicated above in a general way and as illustrated further herein in other exemplary embodiments, without altering the applicability of the present invention. In the first described embodiment the reciprocation of the slide or ram is produced by means of driving eccentrics which are rotatably mounted on fixed shafts, the final drive gears being directly fixed to the eccentrics and thus likewise rotatably mounted on such fixed shafts.

Throughout the several figures of the drawings like characters of reference denote like parts and, in the embodiment of Figs. 1 through 5, the numerals 10 and 11 designate conventional side columns of a straight side power press of the two point eccentric type. A crown 12 surmounts the side columns 10 and 11 in the usual manner and supports and gives bearing to the various power transmission elements leading from a driving motor 13 to a pair of final drive gears 14 and 15 which are directly connected with driving eccentrics 16 and 17, respectively.

The combination of the gear 14 and eccentric 16 is rotatably mounted on a fore and aft shaft 18 which is normally fixed but is supported at its opposite ends for free rotation in the front and rear walls of crown 12 for rotative angular adjustment in a manner and for a purpose which will presently appear. The combination comprising final drive gear 15 and eccentric 17 is likewise mounted on a normally fixed shaft 20 mounted in the front and rear portions of crown 12.

The output shaft of driving motor 13 is belt connected to a flywheel 22 as at 23 and a pinion 24 on the flywheel shaft drives a pair of meshing intermediate gears 25 and 26, by meshing engagement with one of them, in the present instance intermediate gear 26. Pinions 27 and 28, which are coaxial with and fixed for rotation with intermediate gears 25 and 26 respectively, are in meshing driving engagement with the final drive gears 14 and 15, respectively.

The construction and operation of shafts 18 and 20 and the mechanisms carried thereby and cooperating therewith are the same and the following description will therefore describe only the left-hand press control and slide release mechanism associated with shaft 18. Shaft 18 is provided with an eccentric enlargement 30 which may be formed integrally therewith and is preferably so disposed that in the normal operating position of shaft 18 the axis of the enlarged eccentric portion 30 is displaced from the main axis of shaft 18 in a direction toward the point of meshing engagement of final drive gear 14 with its driving pinion 27. The purpose of this arrangement of the eccentric axis will presently appear.

Eccentric 16 and final drive gear 14 are fixed to each other in any desired manner, in the present instance by manufacture as a single unit, and both are mounted for free rotation on the eccentric enlargement 30 of shaft 18.

An arm 32 is fixed to shaft 18 and extends upwardly, in the present instance, through the top of crown 12. Referring to Fig. 2 a cylinder member 33 is mounted on the top of crown 12 with its axis extending horizontally and laterally with respect to the power press proper. The axis of cylinder 33 is disposed so that it intersects the upper end of arm 32 and a piston 34 mounted in cylinder 33 has a rounded bearing portion 35 at its outer end which bears in a complementary seat formed in an abutment block 36.

Abutment block 36 has dovetail connection with the upper end of arm 32 at 37 to permit free vertical sliding movement of the abutment block 36 upon oscillation of arm 32. Arm 32 is positively prevented from any rotary movement in a clockwise direction as viewed in Fig. 2 by a block 40 which is supported on the crown of the press and bears against the right-hand side of the upper portion of arm 32 as viewed in Fig. 2. The abutment of block 40 against arm 32 thus prevents clockwise angular movement of shaft 18 and eccentric enlargement 30 from the normal position shown in Fig. 2.

A micro switch 44 has an operator 45 which bears against the upper end of arm 32 when arm 32 is in the normal position illustrated in Fig. 2. When an abnormal condition occurs and arm 32 rocks to the left as viewed in Fig. 2, operator member 45 likewise moves to the left and actuates micro switch 44, which is in the clutch control circuit of the press, to release the clutch and stop the press.

The left-hand end of cylinder 33 has a hydraulic pressure connection 48 which leads from an outlet pressure conduit 49 of a high pressure hydraulic pump 50 which is driven, in the present instance, by an electric motor 51. Pressure connection 48 leads in common to the corresponding end of the cylinder associated with the right hand shaft 20 and its related drive parts. An accumulator arrangement is provided for maintaining a predetermined hydraulic pressure in pressure connection 48 and therefore in the left-hand end of cylinder 33 and its companion right-hand cylinder.

Such accumulator arrangement may be of various forms and, merely by way of example, a typical arrangement is illustrated schematically in Fig. 2. As there shown an air cylinder 55 and an inter-connected hydraulic cylinder 56 are disposed so that the interior of the hydraulic cylinder 56 is in series between pressure conduit 49 and pressure connection 48.

Air cylinder 55 has a pressure supply connection 57 and the piston of air cylinder 55 has a sufficiently large area with respect to the piston of cylinder 56 to maintain a high hydraulic pressure, say 2,000 pounds per square inch, in the hydraulic line by maintaining an air pressure against the piston of the air cylinder of, say 100 pounds per square inch. In the instance illustrated schematically in Fig. 2 a limit switch 60 is operated by the piston rod 62 of the accumulator to control the amount of oil in the accumulator cylinder for maintenance of the desired hydraulic pressure. Limit switch 60 controls conductors 64 and 65 leading to pump operating motor 51.

The operation of the control means of the present invention, in the form illustrated herein by way of example, will now be described. It will be noted that the eccentricity of the enlargement 30 is so disposed that an upward thrust thereagainst by or through eccentric 16 produces a counterclockwise rotative moment of shaft 18, the lever arm of this moment being equal to the horizontal distance between the center of shaft 18 proper and the center of eccentric formation 30. This moment is resisted by piston 34 which acts against arm 32 through a relatively long lever arm equivalent to the vertical distance from the center of shaft 18 to the center of piston 34.

By way of example, if the eccentricity of enlargement 30, measured horizontally, is one-half inch and the effective length of arm 32 is thirty-two inches, the mechanical advantage of piston 34 to resist the upward thrust of eccentric 16 would be 64 to 1. If piston 34 were approximately three inches in diameter, again by way of example, a 2,000 pound per square inch hydraulic pressure would produce a horizontal force against arm 32 of approximately 14,000 pounds which will approximately balance an upward thrust from eccentric 16 of approximately 900,000 pounds or 450 tons. This establishes a definite release point for the clutch mechanism of the power press through operation of micro switch 44 or the corresponding micro switch at the other side of the press and it will be seen that regulation of the pressure in cylinder 33 and its companion cylinder permits ready variation of this adjusted release point.

Regardless of the actual maximum force which the power press is capable of exerting, whenever the applied force exceeds the setting of the foregoing release mechanism, arm 32 will overcome the hydraulic pressure in cylinder 33 and rock to the left with shaft 18, to which it is secured, to stop the press.

At this point the drive transmission proper is rendered inoperative due to the condition of limit switch 44 but the press slide or ram may be raised to relieve the jammed or stuck condition by operation of the ram or slide adjustment mechanism with which power presses are conventionally provided.

Power presses of substantial capacity frequently, in fact generally, are provided with independently powered motor operated means for effecting slide adjustments and upward movement of the slide or ram of the press under the impetus of the power operated adjusting means will take place.

To effect this upward movement of the slide it is necessary to relieve the resisting pressure in cylinder 33 to permit further counter-clockwise rocking movement of arm 32 and to this end a bypass conduit 66 leads from pressure connection 48 to the oil reservoir 67 of the hydraulic system.

Bypass conduit 66 is provided with a normally closed solenoid valve 68 which is controlled by a push button 69 at the operator's station of the press. Thus the operator may relieve the pressure in cylinder 33 and its companion cylinder to permit upward movement of the slide by operation of the slide adjusting mechanism and for any other purpose which requires relief of the resisting hydraulic pressure.

Counter-clockwise movement of arm 32 in the foregoing operation may be of a substantial degree, being accommodated by upward sliding movement of abutment block 36 on its dovetail connection with arm 32, and such movement of arm 32 is freely permitted by longitudinal slots 70 and 71 which are formed in the right-hand end of cylinder 33, Cylinder 33 and piston 34 are provided with key slots 74 which register when the parts are in the position illustrated in Fig. 2 so that a transverse key may be inserted in the registering slots to render the entire throwout arrangement of the present invention inoperative when its use is not desired for any reason.

The axis of the eccentric formation 30 has been described as being in line with the axis of shaft 18 and drive pinion 27. For this reason the counter-clockwise relieving movement of arm 32 and shaft 18 produces a partial unmeshing movement of final drive gear 14 with respect to its driving pinion 27 so that there is no jamming of the teeth of these mating gears during this operation.

After the abnormal condition has been remedied or overcome, pressure in cylinder 33 and its companion cylinder may be restored to return arm 32 and associated parts to the position illustrated in Fig. 2 for further normal press operation.

The embodiment of Figs. 6 and 7 shows the principles of the present invention applied to an otherwise conventional double crank power press of the straight side type. The problem of utilizing the upward thrust of a crankshaft, which results when work resistance is encountered, to produce a turning moment about the crankshaft which is usable for load control purposes requires a somewhat different control eccentric arrangement than that shown in the previous embodiment for eccentric-type drives.

The power press of Figs. 6 and 7 comprises generally side columns 90 and 91, a crown 92, and a vertically reciprocable slide or ram 93. A crankshaft 96, in the present instance of the double throw type, reciprocates the slide 93 by means of a pair of connections or pitmans 97 and 98.

The crankshaft is supported for driving rotation in the crown 92 by means of bearings 100, 101, 102 and 103. The corresponding journal portions of crankshafts 96 do not engage the bearings 100 through 103 directly but each such journal portion is disposed in a bushing, the bushings being designated 104 through 107, respectively. The bushings are mounted for free rotation in their respective bearings 100 through 103 and receive the crankshaft journals for free rotation therein. Despite this free rotative mounting, the bushings are normally maintained against rotation in a manner and for a purpose which will presently appear.

Each of the bushings 104 through 107 is of the eccentric type, their inner bores being eccentric with respect to their external peripheries. In the illustrated instance the bushings are all so disposed that their thinner wall portions are to the left as viewed in Fig. 6, so that upward thrust of the crankshaft journals against the bushings, in reaction to pressing forces exerted by the power press, produces an upward force to the left of the axis of the outer peripheries of the bushings and thus tends to rotate the several bushings in a clockwise direction as viewed in Fig. 6.

Each of the bushings 104 through 107 has fixed to an end thereof in any desired manner a gear sector, the several gear sectors being designated 112 through 115 respectively, and the gear sectors mesh with pinions 120 through 123, respectively, which are fixed to a rock shaft 124 which, in addition to being the operating rock shaft for the overload arrangement of the present invention, serves to synchronize the several gear sectors and accordingly maintains their attached eccentric bushings 104 through 107 in a synchronized condition of angular adjustment to maintain a uniform axis of support for the crankshaft journals.

Rock shaft 124 is mounted in bearings 130 through 133 on the crown 92 and has a further pinion 135 fixed thereto and in mesh with a rack bar 136 formed on a piston rod or piston 137 whose other end extends into a cylinder 138 which corresponds to the cylinder 33 of the embodiment of Figs. 1 through 5, piston or piston rod 137 corresponding in function and operation to the piston 34 of the previous embodiment.

The embodiment of Figs. 6 and 7 is provided with hydraulic control means, abutment means, limit switch means and related apparatus as in the embodiment of Figs. 1 through 5 and a repetition of the illustration and description of such control instrumentalities need not be repeated in the description of the present embodiment, since the operation is identical excepting for the eccentric bushing construction just described and the manner in which the magnitude of the force being exerted by the press is transmitted to cylinder 138 to produce a corresponding hydraulic fluid pressure therein.

Figs. 8 and 9 show the control arrangement of the present invention applied to a single crank power press of the inclinable type which comprises the usual C frame member conventionally employed in gap presses of this general type, as at 148 in Fig. 8, mounted on a base 149 and including a bed 150 and a reciprocable slide 151.

Referring to Fig. 9, a single throw crankshaft 153 has a connection or pitman 154 which connects with slide 151 in the usual way. The end journals of crankshaft 153 are rotatively mounted in eccentric bushings 155 and 156 which are in turn rotatively mounted in bearings 157 and 158, respectively, which are carried by frame 148.

The eccentric bushings 155 and 156 are normally so positioned, in the example set forth in Figs. 8 and 9, that the axis of the bores of the bushings is to the right of the axis of their exterior peripheries, as viewed in Fig. 8, so that the upward reaction force exerted by the crankshaft journals produces a counterclockwise turning moment on the eccentric bushings, as viewed in Fig. 8.

The bushings 155 and 156 have fixed to their outer ends gear sectors 160 and 161, respectively, which mesh with pinions fixed to a rock shaft 163 which is mounted for free rotation in bearings 164 secured to the frame 148. The pinion meshing with eccentric 161 is designated 166 in Fig. 8. Here again the rock shaft 163 serves the important function of synchronizing the gear sectors and accordingly maintaining the eccentric bushings 155 and 156 in identical relative angular positions for accurate axial support of crankshaft 153.

As indicated in Fig. 8 a hydraulic cylinder 170 is supported between the rear portions of the side columns of frame 148 and its piston or piston rod 171 has an outward rack bar extension 172 which is in mesh with a pinion likewise fixed to rock shaft 163. In Fig. 8 the pinion which meshes with rack 172 lies directly beyond pinion 166 and is accordingly not visible.

The manner in which the twisting moments applied to eccentric bushings 155 and 156 are translated to varying hydraulic pressure forces in cylinder 170, and the manner in which those forces are employed to establish maximum load limits and to effect raising of the slide 151, are all the same as in the previously described embodiments and accordingly the operation of the apparatus of Figs. 8 and 9 need not be redescribed.

In any of the foregoing embodiments the control pressure which determines the maximum pressure which the press will exert in a given instance may be determined directly from and by the working requirements by running the slide down to the work with the slide adjustment set a little higher than needed to do the work. Then the pressure exerted by the accumulator is gradually increased to develop an increasing pressure in the control cylinder which acts against arm 32 in the first described embodiment or the gear sectors of the other embodiments to apply pressure to the work beneath the slide until the work is accomplished, as in embossing for example. The fluid pressure which is developed at the time when the work is completed shows directly what the pressure setting should be in the final set-up for that particular job.

What is claimed is:

1. In a power press having a frame, a reciprocable slide, and drive means for said slide including an eccentric driving part, a member acting between said eccentric driving part and said frame, said member having a part rotatably engaging said frame and a part rotatably supporting said eccentric driving part on an axis laterally offset from the axis of rotatable engagement with said frame, whereby the reaction thrust against said eccentric driving part exerts a turning moment on said member, and machine controlling torque responsive means opposing said turning moment to control machine operation in accordance with the magnitude of said reaction thrust.

2. In a power press having a frame, a reciprocable slide, and drive means for said slide including an eccentric driving part, a member acting between said eccentric driving part and said frame, said member having a part rotatably engaging said frame and a part rotatably supporting said eccentric driving part on an axis laterally offset from the axis of rotatable engagement with said frame, whereby the reaction thrust against said eccentric driving part exerts a turning moment on said member, and adjustable machine controlling torque responsive means opposing said turning moment to variably limit the maximum force applied to said reciprocable slide.

3. In a power press having a frame, a reciprocable slide, and drive means for said slide, said drive means including a rotatable drive member having an eccentric driving part and a member acting between said rotatable member and said frame, said last mentioned member having a part rotatably engaging said frame and a part rotatably supporting the rotatable drive member on an axis laterally offset from the axis of rotatable engagement with said frame, whereby reaction thrust of said rotatable drive member exerts a turning moment on said last mentioned member, a torque arm fixed to said last mentioned member, machine controlling means engaged by said torque arm and normally opposing said turning moment and operable to control machine operation in accordance with the magnitude of said turning moment.

4. In a power press having a frame, a reciprocable slide, and drive means for said slide, said drive means including a rotatable drive member having an eccentric driving part and a member acting between said rotatable member and said frame, said last mentioned member having a part rotatably engaging said frame and a part rotatably supporting the rotatable drive member on an axis laterally offset from the axis of rotatable engagement with said frame, whereby reaction thrust of said rotatable drive member exerts a turning moment on said last mentioned member, a torque arm fixed to said last mentioned member, and adjustable force means normally opposing angular movement of said torque arm and movable when overcome by said turning moment to stop the press.

5. In a power press, a reciprocable slide and drive means therefor including a rotatable eccentric member and means connecting the same with said slide, a supporting shaft having journal means for rotatably mounting the same with respect to the power press and bearing means for rotatably supporting the eccentric member, the axis of said bearing means being offset laterally from the axis of the journal means whereby the driving force of the eccentric member reacts to apply a torsional moment to said shaft about said bearing axis, and torque responsive means associated with said shaft for controlling operation of said power pressure in accordance with the magnitude of said torsional moment.

6. In a power press, a reciprocable slide and drive means therefor including a rotatable eccentric member and means connecting the same with said slide, a supporting shaft having means for rotatably mounting the same with respect to the power press and means for rotatably supporting the eccentric member, the axis of said eccentric supporting means being offset laterally from the axis of the rotatable mounting means whereby the driving force of the eccentric member reacts to apply a torsional moment to said shaft about said rotatable mounting means axis, and torque arm means fixed to said shaft for controlling operation of said power press in accordance with the magnitude of said torsional moment.

7. In a power press, a reciprocable slide and drive means therefor including a rotatable eccentric member and means connecting the same with said slide, a normally stationary shaft having an eccentric formation upon which said eccentric member is mounted for free slide-driving rotation, the axis of said eccentric formation being offset laterally from the axis of the shaft proper whereby the reaction of downward driving movement of the eccentric member acts upwardly against the axis of the eccentric formation to apply a torque couple to said shaft proportionate to the downward driving force being exerted by the eccentric member, and machine controlling torque-responsive means acted upon by said shaft turning moment to control machine operation in accordance with the magnitude of the driving force of the eccentric member.

8. In a power press, a frame, a reciprocable slide and drive means therefor including a crankshaft, said crankshaft having a crank connected with said slide to reciprocate the same and journal means for rotatably supporting the crankshaft, bearing means rotatably mounted in said frame and eccentrically bored to receive the crankshaft journals whereby the axis of the crankshaft journals is laterally offset from the axis of the rotatable mounting of the bearing means and the driving force of the crankshaft imparts a turning moment to said bearing means, and torque responsive means associated with said bearing means for controlling operation of said power press in accordance with the magnitude of said turning moment.

9. A machine including a reciprocable member movable to execute working and return strokes, a rotatable eccentric member connecting with the reciprocable member for operating the same and drive means for said eccentric member, a supporting shaft and means mounting the same for angular movement about a support axis, said eccentric member being mounted on said shaft for free rotation on an axis transversely offset from the support axis whereby the working-stroke reaction tends to move the supporting shaft angularly about said support axis, adjustable force means normally opposing such rotation and means operable to interrupt said drive means when said force means is exceeded by said reaction and said shaft moves angularly.

References Cited in the file of this patent

UNITED STATES PATENTS

| | | |
|---|---|---|
| 2,522,450 | Johansen | Sept. 12, 1950 |
| 2,522,451 | Johansen | Sept. 12, 1950 |
| 2,522,452 | Johansen | Sept. 12, 1950 |
| 2,551,825 | Cook | May 8, 1951 |
| 2,578,546 | Havener | Dec. 11, 1951 |